Dec. 16, 1930.  S. A. STRICKLAND ET AL  1,784,914
ROLLER BEARING
Filed Dec. 26, 1928   2 Sheets-Sheet 1
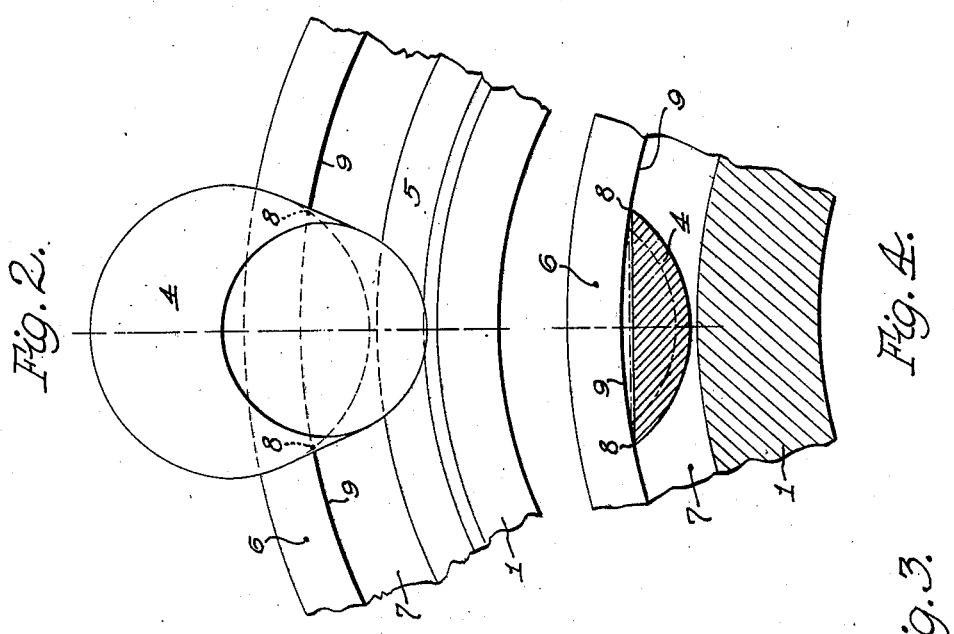
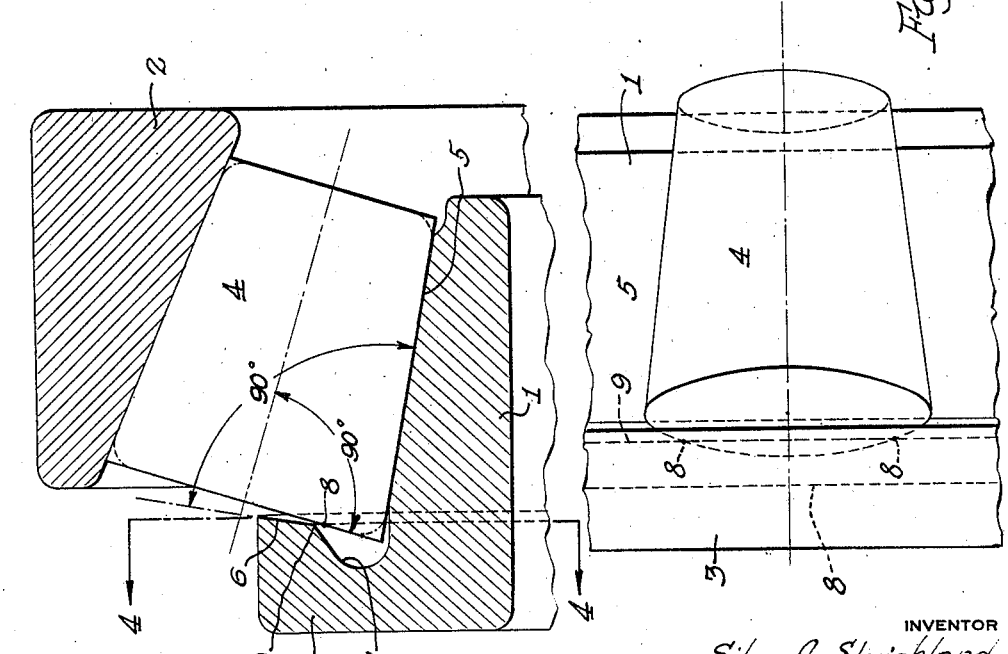
INVENTOR
Silas A. Strickland,
Thomas Zimmerman,
BY
ATTORNEY Dec. 16, 1930.  S. A. STRICKLAND ET AL  1,784,914
ROLLER BEARING
Filed Dec. 26, 1928   2 Sheets-Sheet 2
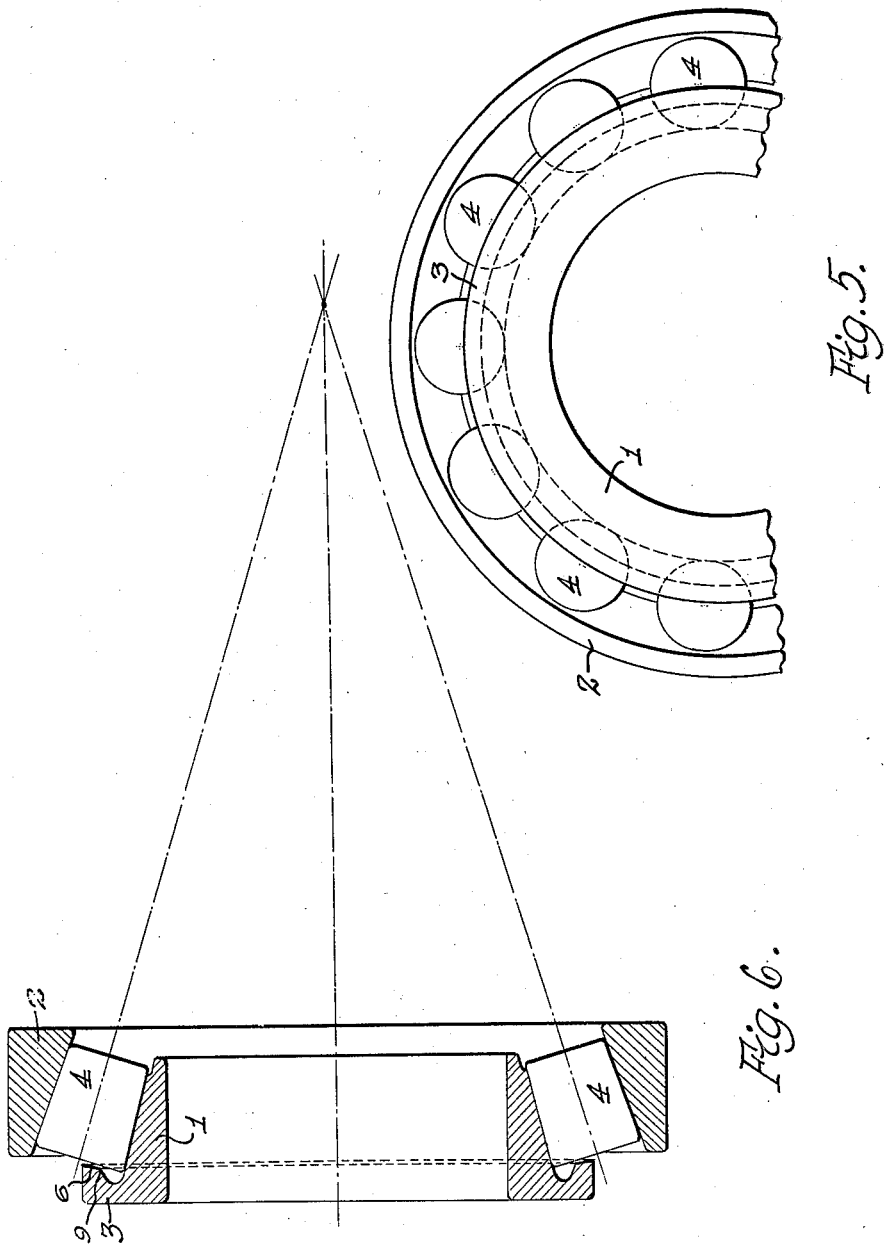
INVENTOR
Silas A. Strickland,
Thomas Zimmerman,
BY
ATTORNEYS Patented Dec. 16, 1930

1,784,914

UNITED STATES PATENT OFFICE

SILAS A. STRICKLAND AND THOMAS ZIMMERMAN, OF DETROIT, MICHIGAN, ASSIGNORS TO BOWER ROLLER BEARING COMPANY, OF DETROIT, MICHIGAN, A CORPORATION OF MICHIGAN

ROLLER BEARING

Application filed December 26, 1928. Serial No. 328,329.

This invention relates particularly to roller bearings wherein tapered or conoidal rolls are employed to take end thrust as well as radial loads and the principal object of the present invention is to simplify construction and reduce the cost of manufacture of bearings of this nature.

A further object is to provide a construction wherein frictional resistance to rotation of the rolls and wear is reduced to a minimum, and perfect alinement of the rolls is maintained.

It is also an object to provide a construction wherein grinding of the raceway and thrust-receiving shoulder is facilitated and rolls having flat or substantially flat thrust transmitting end surfaces may be employed with equally as good or better results than other forms which are more costly to manufacture.

It is also an object to secure a two-point or two-area contact between thrust receiving and thrust transmitting areas whereby elemental lined contact is maintained between rolls and cone, such contacts being had at widely spaced apart points of the end surface of each roll and well outwardly on said surface radially of the bearing, each roll being out of contact with and free of said thrust receiving surface except at such spaced apart limited contact points or areas.

A further object is to provide a construction wherein these contact points or areas are so positioned upon the thrust shoulder as to preclude the chipping or cracking of the shoulder adjacent such contacts and wherein provision is made for the lodgment of foreign matter or metal particles to prevent the same from reaching the bearing and contact surfaces and causing a grinding action as the rolls revolve, and to also form an annular oil retaining channel at the meeting angle of the face of the thrust shoulder and the conical surface of the raceway.

A further object is to provide certain other new and useful features in the construction, arrangement and combination of rolls, raceways, and thrust receiving shoulder, all as hereinafter more fully set forth.

With the above and other ends in view, the invention consists in providing in a bearing having inner and outer conical raceways with interposed conoidal rolls, an annular thrust receiving shoulder having an annular surface opposed to the roll ends and the plane of which surface forms an angle of ninety degrees or more with the conical surface of the raceway for the rolls, said surface being formed to provide point contact with the end thrust transmitting surfaces of the rolls at widely spaced apart points on said end surfaces and well radially outward of the bearing, said shoulder being formed with a deep annular groove radially inward of the bearing from said points of contact, whereby end thrust may move said rolls endwise into contact with said thrust collar, said groove permitting such endwise movement and causing said shoulder to contact said end surfaces of the rolls at a considerable distance outwardly from the conical surface of the inner raceway only, said groove also providing clearance between said shoulder and roll ends inwardly of said place of contact, to provide for free rotative movement of the peripheral portion of each roll within said groove.

The invention further consists in providing a conical raceway with a thrust receiving shoulder integral therewith and with which shoulder the thrust transmitting end surfaces of the rolls contact at a considerable distance inwardly of said shoulder from the outer edge thereof whereby wear and chipping of the shoulder is reduced to a minimum, said shoulder being also formed with a deep annular groove adjacent the meeting angle of the cone and shoulder to provide a place of lodgment for foreign matter and prevent such matter from clogging or otherwise interfering with the free non-frictional rotation of the rolls.

The invention further consists in a construction whereby manufacture of the bearing is greatly facilitated and its cost reduced, and a construction, arrangement and combination secured embodying certain other new and useful features and advantages.

Referring to the accompanying drawings, Figure 1 is an enlarged sectional detail of a portion of a bearing illustrative of an embodiment of the invention and showing inner and outer raceways in section and an interposed conical roll in elevation;

Fig. 2 is an end elevation of Fig. 1 with the outer raceway removed;

Fig. 3 is a plan view of Fig. 1 with the outer raceway removed;

Fig. 4 is a section substantially upon the line 4—4 of Fig. 1;

Fig. 5 is an end elevation of a portion of the bearing; and

Fig. 6 is a longitudinal section through the bearing.

Tapered roller bearings adapted to take end thrust are commonly constructed so that the end thrust which is applied parallel to the axis of rotation of the bearing, is transformed into radial components acting perpendicular to the axes of the conical rolls and thus become a radial pressure within the outer race or cup. To secure such desired radial thrust or pressure in the proper direction, a prolongation of the generating elements of the conical surfaces of the inner and outer raceways should meet at a point within a prolongation of the axis of rotation of the bearing and the rolls should be correspondingly tapered, that is, when the bearing is adjusted for operation, the elements of all of the conical surfaces should converge to the same origin within the axial line of rotation of the bearing. In a bearing so arranged, the conoidal rollers will be impelled by the reaction which is exerted upon them by the cone 1 and the race or cup 2 in a direction away from such point of convergence of the elements of their conical surfaces and to restrain these rolls against such endwise movement in the direction of their axes a shoulder of some form is usually provided upon the cone 1 to be engaged by the large ends of the rollers, said shoulder thus taking the end thrust of the rolls.

In the present construction the invention lies in the combination and arrangement of the thrust shoulder with the conical rolls and raceways together with the form of the thrust shoulder. In the present construction the thrust shoulder 3 is an integral part of the cone 1 and the face of this shoulder which is opposed to the ends of the rolls 4 is formed at an angle of ninety degrees or more to the conical surface 5 of the cone 1. By making this face at an angle of substantially ninety degrees to the conical face, both surfaces can be accurately ground in one operation, thus greatly facilitating the manufacture of the cone member, this being a characteristic feature of the present invention.

Where the face 6 of the shoulder is formed at an angle of less than ninety degrees to the conical surface 5, it is difficult to accurately grind the surfaces and where concurrent grinding cannot be had they must be ground by separate grinding operations. Further, where the surface 6 meets the surface 5 at an angle, it is necessary to form the contacting ends of the rollers to conform, in a measure at least, to the shape of this thrust receiving face of the shoulder, as by forming a spherical or conical end on each roll, otherwise the angle of the roll within the meeting angle of the collar and cone will prevent the roll from contacting the collar except within this angle and the roll will therefore have a single point or small area of contact with the collar. In order that flat end rolls, or rolls the end surfaces of which are normal to the axis of the rolls, may be used and a two point contact between roll end and shoulder secured, the shoulder 3 is cut away at the meeting angle of the surfaces 5 and 6, forming a deep annular groove 7 which permits a movement of the roll endwise toward the shoulder, the groove giving clearance for the end angle of the roll so that this end angle may have free rotative movement within said groove. The flat end surface of the roll is thus brought into contact with the shoulder at widely spaced apart points 8 as illustrated in Fig. 4, contacting the angle 9 of the shoulder 3 where the annular groove 7 cuts, in cross-section, inwardly of the shoulder from the surface 6 thereof, and as this shoulder is concentric with the axis of the bearing and as each roll has an end surface perpendicular to the axis of the roll, said end surface will contact said angle 9 of said shoulder adjacent the periphery of said end surface of said roll at the widely spaced points 8 or which are at points well outwardly on said periphery from the side of the roll in contact with the cone surface 5, at each side of the roll, holding each roll in perfect alignment, that is, preventing skewing of the roll and maintaining true elemental line contact between the conical surface of each roll and the conical surface 5 of the conical raceway and spacing and holding said rolls out of contact with each other and in free independent rolling position upon the cone.

As each roll is tapered and formed with a thrust transmitting end surface normal to the axis of the roll, and as the surface 6 of the thrust receiving shoulder extends at an angle of ninety degrees or more to the conical surface of the cone upon which the rolls travel, there is a space or gap between the roll end and said surface 6 due to such difference in the angular position of said opposed surfaces, and the roll end being flat, spans an arc of the annular angle 9 of the shoulder, contacting at two points only of said shoulder angle. Thus the end thrust of the rolls is taken by said shoulder at said angle only which is at the inner edge of the surface 6 and is an obtuse angle which may be accurately ground and will not chip or crack due to the support afforded by that portion of the shoulder extending outwardly beyond said angle. Therefore as said contact angle 9 of said thrust shoulder wears in use, the two points at which each roll end contacts therewith become small areas which afford better roll alignment without materially increasing frictional resistance to rotation of the rolls.

By this construction wherein the thrust shoulder is formed with a deep annular groove inwardly from its outer edge, an efficient two point contact between rolls and thrust shoulder is secured, excessive wear and disintegration of the shoulder is prevented, a very efficient construction secured, friction reduced to a minimum and overheating of the bearing from such causes eliminated. This construction of thrust shoulder not only provides for a two point contact of each roll therewith but also affords an annular channel for lubricant and to receive any foreign matter or metal particles that may get into the bearing and prevent these particles from getting in between the contacting surfaces of rollers and cone.

Obviously the end angles of the several rolls may be rounded as shown in dotted lines, if so desired, to prevent chipping or cracking as such form of rolls will operate the same as those formed with sharp angles, and such changes in the construction and arrangement or size or proportion of the parts as fall within the scope of the appended claims, are contemplated.

Having thus fully described our invention, what we claim is:—

1. In tapered roller bearing structures, wherein the rolling cones and coacting conical surfaces produce a resultant endwise thrust of said cones, a bearing having an annular shoulder to take such end thrust, a cross-section of the bearing presenting said shoulder as having its active face projecting relative to a plane corresponding to the adjacent one of said conical surfaces with the projection at such angle as to permit of concurrent grinding of the active faces of both the shoulder and conical surface, said shoulder being recessed inwardly at the apex of the planes which produce the angle to locate the thrust-receiving line of the shoulder as spaced from the plane of the adjacent conical surface, and as the lower boundary of the ground face of the shoulder, whereby the cone thrust will be presented as a spaced two point or zone contact.

2. A bearing structure as in claim 1 characterized in that the angle formed by the planes of the shoulder face and the adjacent conical surface is of at least ninety degrees.

3. A bearing structure as in claim 1 characterized in that the angle formed by the planes of the shoulder face and the adjacent conical surface is of at least ninety degrees, such shoulder face beyond the recess extending in a plane corresponding to that of the shoulder-face portion of the angle.

4. A bearing structure as in claim 1 characterized in that the dimensions of the recess are such that its wall overlies both the end of the rolling cone and the end-zone of the peripheral surface of such cone to form a lubricant-receiving channel active in the lubrication of the rolling cones.

In testimony whereof we affix our signatures.

SILAS A. STRICKLAND.
THOMAS ZIMMERMAN.